US008200796B1

(12) United States Patent  
Margulis

(10) Patent No.: US 8,200,796 B1  
(45) Date of Patent: Jun. 12, 2012

(54) GRAPHICS DISPLAY SYSTEM FOR MULTIPLE REMOTE TERMINALS

(75) Inventor: Neal D. Margulis, Woodside, CA (US)

(73) Assignee: Digital Display Innovations, LLC, Woodside, CA (US)

( * ) Notice: Subject to any disclaimer, the term of this patent is extended or adjusted under 35 U.S.C. 154(b) by 1028 days.

(21) Appl. No.: 11/450,100

(22) Filed: Jun. 9, 2006

Related U.S. Application Data

(63) Continuation-in-part of application No. 11/122,457, filed on May 5, 2005, now Pat. No. 7,667,707, and a continuation-in-part of application No. 11/139,149, filed on May 27, 2005.

(51) Int. Cl.
*G06F 15/173* (2006.01)
*G06F 15/16* (2006.01)

(52) U.S. Cl. ..................... 709/223; 709/217

(58) Field of Classification Search .......... 709/217, 709/223; 345/1.14, 545
See application file for complete search history.

(56) References Cited

U.S. PATENT DOCUMENTS

| | | |
|---|---|---|
| 5,602,589 A | 2/1997 | Vishwanath |
| 5,708,961 A | 1/1998 | Hylton |
| 5,850,482 A | 12/1998 | Meany |
| 5,852,437 A | 12/1998 | Wugofski |
| 5,862,348 A | 1/1999 | Pedersen |
| 5,909,518 A | 6/1999 | Chui |
| 5,911,582 A | 6/1999 | Redford |
| 5,977,933 A | 11/1999 | Wicher |
| 6,031,940 A | 2/2000 | Chui |
| 6,075,906 A | 6/2000 | Fenwick |
| 6,075,938 A | 6/2000 | Bugnion |
| 6,097,441 A | 8/2000 | Allport |
| 6,104,334 A | 8/2000 | Allport |
| 6,141,059 A | 10/2000 | Boyce |
| 6,141,447 A | 10/2000 | Linzer |
| 6,222,885 B1 | 4/2001 | Chaddha |
| 6,256,019 B1 | 7/2001 | Allport |
| 6,263,503 B1 | 7/2001 | Margulis |
| 6,282,714 B1 | 8/2001 | Ghori |
| 6,323,854 B1 * | 11/2001 | Knox et al. .................. 345/418 |

(Continued)

OTHER PUBLICATIONS

Schmidt, B.K., Lam, M.S., Northcutt, J.D.; The Interactive Performance of SLIM: a Stateless, Thin-client Architecture; 17th ACM Symposium on Operating Systems Principles (SOSP'99); Dec. 1999; pp. 32-47; Published as Operating Systems Review, 34(5); ACM.

(Continued)

*Primary Examiner* — Phuoc Nguyen
*Assistant Examiner* — Steven Nguyen
(74) *Attorney, Agent, or Firm* — Eppa Hite

(57) ABSTRACT

An efficient architecture for a virtual desktop system in a Virtual Machine Monitor (VMM) operating environment. In one embodiment, initially, a virtual desktop computer system utilizing one or more host computer systems provides one or more remote display systems with interactive graphics and video capabilities. The host computer system generally manages windows and frames that correspond to remote display systems and manages updating the remote display systems over a network connection. Preferred embodiments include a multi-display processor that is enhanced for VMM operating environments.

VMM operating environments typically consist of different Virtual Machines (VMs) and a control layer known as the Virtual Machine Monitor (VMM) that manages the different VMs. Each VM is typically designed to be unaware of the existence of other VMs and the VMM is designed to provide the necessary abstraction, isolation and coordination between the different VMs to the physical platform hardware.

20 Claims, 9 Drawing Sheets

U.S. PATENT DOCUMENTS

| | | | |
|---|---|---|---|
| 6,340,994 B1 | 1/2002 | Margulis | |
| 6,409,602 B1 | 6/2002 | Wiltshire | |
| 6,437,803 B1 | 8/2002 | Panasyuk | |
| 6,456,340 B1 | 9/2002 | Margulis | |
| 6,510,177 B1 | 1/2003 | De Bonet | |
| 6,522,334 B2 | 2/2003 | Schauser | |
| 6,600,838 B2 | 7/2003 | Chui | |
| 6,611,530 B1 | 8/2003 | Apostolopoulos | |
| 6,628,716 B1 | 9/2003 | Tan | |
| 6,658,019 B1 | 12/2003 | Chen | |
| 6,701,380 B2 | 3/2004 | Schneider | |
| 6,704,791 B1 | 3/2004 | Harris | |
| 6,721,837 B2 | 4/2004 | MacInnis | |
| 6,725,289 B1 | 4/2004 | Waldspurger | |
| 6,754,266 B2 | 6/2004 | Bahl | |
| 6,757,851 B1 | 6/2004 | Park | |
| 6,768,775 B1 | 7/2004 | Wen | |
| 6,771,828 B1 | 8/2004 | Malvar | |
| 6,774,912 B1 | 8/2004 | Ahmed | |
| 6,781,601 B2 | 8/2004 | Cheung | |
| 6,785,700 B2 | 8/2004 | Masud | |
| 6,798,838 B1 | 9/2004 | Ngo | |
| 6,806,885 B1 * | 10/2004 | Piper et al. | 345/545 |
| 6,807,308 B2 | 10/2004 | Chui | |
| 6,816,194 B2 | 11/2004 | Zhang | |
| 6,826,242 B2 | 11/2004 | Ojard | |
| 6,834,123 B2 | 12/2004 | Acharya | |
| 6,839,079 B2 | 1/2005 | Barlow | |
| 6,842,777 B1 | 1/2005 | Tuli | |
| 6,847,468 B2 | 1/2005 | Ferriere | |
| 6,850,571 B2 | 2/2005 | Tardif | |
| 6,850,649 B1 | 2/2005 | Malvar | |
| 6,853,385 B1 | 2/2005 | MacInnis | |
| 6,868,083 B2 | 3/2005 | Apostolopoulos | |
| 6,898,583 B1 | 5/2005 | Rising | |
| 6,975,323 B1 * | 12/2005 | Yamamoto | 345/545 |
| 6,977,693 B2 | 12/2005 | Aronovitz | |
| 6,980,695 B2 | 12/2005 | Mehrotra | |
| 7,043,697 B1 | 5/2006 | Jensen | |
| 7,098,868 B2 * | 8/2006 | Love et al. | 345/1.1 |
| 7,127,525 B2 | 10/2006 | Coleman | |
| 7,477,205 B1 * | 1/2009 | de Waal et al. | 345/1.3 |
| 2003/0066046 A1 * | 4/2003 | Dawson | 717/100 |
| 2005/0132363 A1 * | 6/2005 | Tewari et al. | 718/1 |
| 2005/0204015 A1 * | 9/2005 | Steinhart et al. | 709/217 |
| 2005/0210158 A1 * | 9/2005 | Cowperthwaite et al. | 710/1 |
| 2005/0246453 A1 * | 11/2005 | Erlingsson et al. | 710/1 |
| 2006/0132489 A1 * | 6/2006 | Blaho | 345/501 |
| 2006/0139360 A1 * | 6/2006 | Panesar et al. | 345/568 |
| 2006/0146057 A1 * | 7/2006 | Blythe | 345/506 |
| 2006/0190532 A1 * | 8/2006 | Chadalavada | 709/203 |
| 2007/0028244 A1 * | 2/2007 | Landis et al. | 718/108 |

OTHER PUBLICATIONS

Baratto, R.A., Kim, L.N., Nieh, J.; Thinc: A Virtual Display Architecture for Thin-Client Computing; SOSP'05, Brighton, United Kingdom; Oct. 23-26, 2005; pp. 1-14; ACM 1-59593-079-5/05/0010.

Fraser, K, Hand, S., Neugebauer, R., Pratt, I., Warfield, A., Williamson, M.; Safe Hardware Access with the Xen Virtual Machine Monitor; pp. 1-10; University of Cambridge Computer Laboratory; Cambridge, United Kingdom.

Millman, S. E., "LP-5: Late-News Poster: Update to VESA Digital Packet Video Link (DPVL) Proposed Standard," SID 04 Digest, 2004, pp. 412-415, ISSN/0004-0966X/04/3501-0412.

Lamm, J.D., "Digital Packet Video Link—A VESA Proposed Standard," SID 03 Digest, 2003, pp. 1021-1023, ISSN/0003-0966X/03/3402-1021.

Skodras et al., "JPEG2000: The Upcoming Still Image Compression Standard," May 11, 2000, 14 pages.

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

* cited by examiner

GRAPHICS DISPLAY SYSTEM FOR MULTIPLE REMOTE TERMINALS

This application is a Continuation-in-Part of U.S. application Ser. No. 11/122,457 filed May 5, 2005 now U.S. Pat. No. 7,667,707 entitled "Computer System for Supporting Multiple Remote Displays" and of U.S. application Ser. No. 11/139,149 filed May 27, 2005 entitled "Multiple Remote Display System."

BACKGROUND OF THE INVENTION

1. Technical Field

The present invention relates generally to a virtual desktop computer system, and more particularly to using a host system running a Virtual Machine Monitor (VMM) with optimized virtual I/O to support multiple remote display systems.

2. Discussion of Background Art

There are compelling advantages to supporting a virtual desktop configuration for a single user with multiple operating environments, and to supporting multiple users from a single host computer system. However, supporting multiple displays for a single user, or supporting multiple users from a single host system, or supporting one or more users from multiple host computers poses significant challenges for contemporary computer system designers.

Conventional computer systems may utilize a display device to view the output from a host computer system. The display device is typically positioned close to the host computer system because of restrictions imposed by various physical connections that electrically couple the display device to the output of the computer system. In some cases, computer systems may support a second display device that has similar proximity restrictions due to the physical connections.

Remote Terminal (RT) displays may advantageously provide users with additional flexibility when choosing an appropriate viewing location and appropriate locations for the host computer. For example, in a corporate environment, a business may wish to keep all of the host computers in a "Computer Room" that is a secure central location having both physical security and environmental management such as air conditioning and power back-up systems. However, it is necessary for users to utilize the host computer systems from their offices and from desks located outside the "computer room."

The typical office environment today includes personal computers physically located at the users' locations. These personal computers operate on a network having a centralized system for storage, file serving, file sharing, network management and various administrative services. Recognizing the benefits of security, reduced cost of operation, and the general desire for centralizing control, various attempts have been made to reduce the complexity of the computer that resides at the user's location and evolve it into some type of thin client solution. The first portion of the system to be centralized is usually the hard drive, centralizing all of the storage associated with the computer system while the user still runs an operating system on his local desktop. There have been other attempts to centralize more of the computer by effectively turning a client into a dumb terminal, but dumb terminals tend to perform poorly especially for rich multimedia content.

Remote computing systems typically possess certain detrimental operational characteristics that diminish their effectiveness for use in modern computer environments. For example, in order to eliminate restrictive physical proximity connections, remote displays have to resort to ineffective means to transfer the display information from the host computer to the remote display. These ineffective means usually degrade real time performance for video playback and 3D graphics and typically substantially slow down the interactive performance for simple user interface controls.

Some thin clients at the user desktop have a CPU that runs an operating system and have a graphics controller. This makes the thin client, or remote terminal, a system that needs to be maintained with software updates and whose performance is bound by the component selection in the device, not just by the host CPU system. Systems that solve the delay issues by adding more intelligence to the remote display end up with remote systems that require significant processing, a full graphics subsystem including 2D, 3D and video playback, maintenance and system management that significantly reduce the primary justification for centralizing the host computers in the first place.

Recent CPUs have added multiple processor cores as well as virtualization technology. Virtualization technology allows the CPU to support privileged modes, which enables enhanced operating systems and Virtual Machine Monitors (VMM). The VMMs can enable a single CPU to run multiple operating systems, run more than one instance of a single operating system, support multiple users, balance loads between users, allow remote system monitoring and more efficiently manage different system resources. However, CPUs with virtualization technology and VMMs are not adequate alone to support high performance I/O devices such as virtual display systems.

Because of the substantially increased complexity in achieving high performance for multiple remote displays in a VMM system, the host computer systems may require additional resources for effectively managing and controlling the interactive operation of multiple displays across multiple VMMs. A solution is needed that allows a VMM based multi-user host system to more efficiently support numerous remote users with outstanding computing and display performance. A system should allow a host computer to be scaled economically to support numerous virtual desktops for numerous users while delivering an acceptable level of performance.

SUMMARY

The present invention provides an efficient architecture for a virtual desktop system in a Virtual Machine Monitor (VMM) operating environment. In one embodiment, initially, one or more host computer systems provides a virtual desktop computer system which enables interactive graphics and video for one or more remote terminal display systems. The host computer system generally manages windows and frames that correspond to remote display systems and manages updating the remote display systems over a network connection. The preferred embodiments include a multi-display processor that is enhanced for VMM operating environments and various options for partitioning the display processing between the host system and clients which have different capabilities and are connected over different bandwidth connections.

VMM operating environments typically consist of different Virtual Machines (VMs) and a control layer known as the Virtual Machine Monitor that manages the different VMs. Each VM will have a view of, as its exclusive platform, a Virtual Hardware (VH) environment created by the CPU, memory and I/O devices. Each VM is typically designed to be unaware of the existence of other VMs, and the VMM is designed to provide the necessary abstraction, isolation and coordination between the different VMs and the physical platform hardware. CPUs that include virtualization technology add VMM support to coordinate the VM's access to the physical hardware.

The general goal for efficient VMM operation for I/O devices is to allow the VM drivers to operate on their virtual view of the physical hardware within an isolated VM and, where necessary, have the VMM software isolate the VM drivers and provide any arbitration or operations directly on the physical hardware. Support for higher performance within the I/O devices may include the ability to more directly pass through requests from multiple VMs, to quickly switch between VM states when needed, to provide mapping from VM drivers to the physical hardware and to provide special control and status information for the VMM. The various host system software and peripherals, including the multi-display processor, may be optimized to maximize the effectiveness of the host system's CPU's VMM capabilities. Providing graphics processing on a host system operating in a VMM operating environment requires the graphics processing hardware to be shared efficiently between different VMs.

Each VM may include the drivers to access both the display memory and the graphics hardware controls. For higher performance, the Graphics Processing Unit (GPU) with Virtual Display support will handle some VM isolation within the GPU subsystem. This may include various mechanisms for controlling conflicts, supporting ordered accesses and atomic accesses, maintaining VM isolation, supporting address translation and fairly supporting concurrent contexts for the different VMs. Where the hardware can not fully support these mechanisms, there may be a need for the VMM and the additional physical configuration management to assist in managing the physical hardware resources of the GPU.

The different VMs may be for a single user utilizing multiple VMs to create a single unified environment, or different VMs may correspond to as many different users who may be located remotely from the host system and utilize different remote client devices. A single user may choose to utilize multiple VMs to support applications on multiple operating systems or to isolate applications, such as a web browser or multimedia player, within a protected virtual environment. One or more host systems together may form each VM, which creates one or more display windows that are presented in a unified display. The drivers for each VM and the VMM need to isolate the different display windows and then allow them to be appropriately combined for the unified display.

Different remote client devices (RTs) will have different display capabilities and be connected to the host system over different network connections. Each VM may support one or more remote clients with one or more remote displays. The multi-display graphics controller in the host system may be able to perform all of the graphics operations on the host system and provide subframe updates to the remote clients. Alternatively, the remote client may perform the on-screen graphics operations while the multi-display graphics controller may primarily perform the off-screen graphics operations on the host system and only send the updates when such data is needed for on-screen display. The subframe data from the host system may be encoded before it is sent to the remote client.

For each remote system, after the data is encoded, a network processor, or CPU working in conjunction with a simpler network controller, transmits the encoded data over a wired and/or wireless network(s) to a remote display system(s). Each remote display system decodes the data intended for its display, manages the frame updates and performs the necessary processing for the display screen. Other features, such as masking packets lost in network transmission, are managed by the remote display system(s). When there are no new frame updates, the remote display controller refreshes the display screen with the data from the prior frame. While some RTs may be locally connected over a Local Area Network (LAN) to a multi-user host system, other RTs will have a lower performance connection over a Wide Area Network (WAN) to the host system.

With host computers ever increasing their performance by including multiple CPUs and CPUs that have multiple processor cores, the limitation of a single user to a single computer makes less and less economic sense. Host computers may be combined over a high performance network such as Infiniband or 10G Ethernet or combined within a rack of blade based servers. Computing resources can be more effectively allocated to multiple users in the Server Based Computing technique whereby the server runs the applications for users and supports only RT services at the user's terminal. A combination of multiple host computing resources may be regarded as a grid of on-demand computing services and matched to the needs of various users provided with virtual desktops.

Virtual Desktop (VD) support allows the host system to dynamically allocate shared resources such as memory and CPU cycles to higher priority users. VD systems can employ techniques of load balancing, migrating users between VMs, and other means, based on a number of criteria, to grant different users access to different levels of performance and resources. Different priority schemes can be used to allocate shared resources. VD systems can be used to achieve higher data security, to centralize the support for an organization, to enhance disaster recovery and business continuance, and to reduce data storage requirements across an organization. The use of VMs can also be effective in managing the application environment for users, and perform OS and other patches. Each user is allocated a known good VM environment which includes their user defined preferences. User preferences and the user state may be maintained as part of the VM management. Multiple host systems may be used, each of which manages any number of applications or VMs. Some large applications, such as databases, may be more efficiently run within a single virtual machine.

However, an increased complexity may be required for a VD host computer to effectively manage, control and deliver rich application performance for the variety of RT devices that an organization may have.

DETAILED DESCRIPTION OF THE PREFERRED EMBODIMENT

The present invention provides an efficient architecture for a Virtual Desktop (VD) system in a Virtual Machine Monitor (VMM) operating environment where one or more host computer systems supports interactive graphics and video capabilities for one or more remote display systems.

Figure 1:
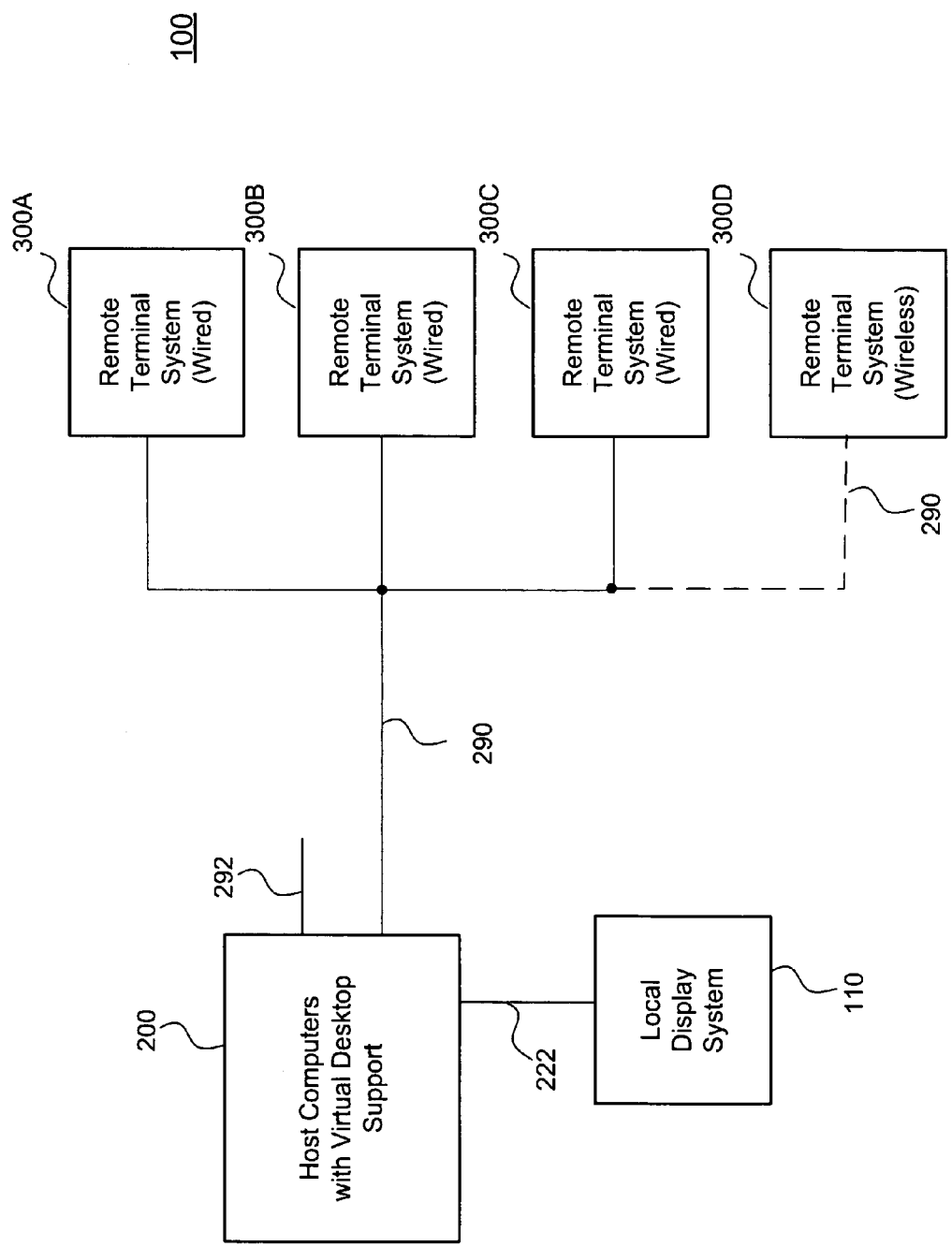
FIG. 1 is a block diagram of a computer system including one or more host computers with Virtual Desktop (VD) support, a network, and multiple Remote Terminals (RTs)

Referring to FIG. 1, the invention provides a multi-user computer system 100. A multi-user server based "Host" computer 200 processes applications for multiple users each utilizing some form of a Remote Terminal (RT) System 300A, 300B, 300C, 300D.

"Host" as used herein may refer to Host 200 as shown or a host can be configured in a variety of ways to support multi-user server based computing and hosted virtual desktop computing. Multiple Hosts 200 may be clustered together to form a computing resource that can be dynamically shared. Within each Host, multiple computer hosts 200 may be ganged together in the form of blades in a rack connected over a backplane or in another multiprocessor configuration. Different Hosts may manage different windows that are combined into a single RT system where the combining happens either at a host aggregation point or at the RT system itself.

Host 200 produces display update network streams over wired network(s) 290 to each of RTs 300A, 300B, 300C, etc., or over a wireless network 290 to display(s) 300D. Users at the RTs are able to time-share the host computer 200 as if it were their own local computer and have complete support for all types of graphics, text and video content with the same type of user experience that could be achieved on a local computer. The VMs may run different operating systems, different applications or some combination of different OSs and applications. A local display system 110 is included typically for a single user or for administrative tasks. The local display may display the outputs from one or more VMs that may or may not be the same VMs corresponding to the RTs. Additional connections 292 may be network connections to a WAN, storage subsystem, other Hosts or a variety of other data center connections and may take the form of GigE, 10G Ethernet, iSCSI, Fiber Channel (FC), Fiber Channel IP (FCIP) or another electrical or optical connection.

Figure 2:
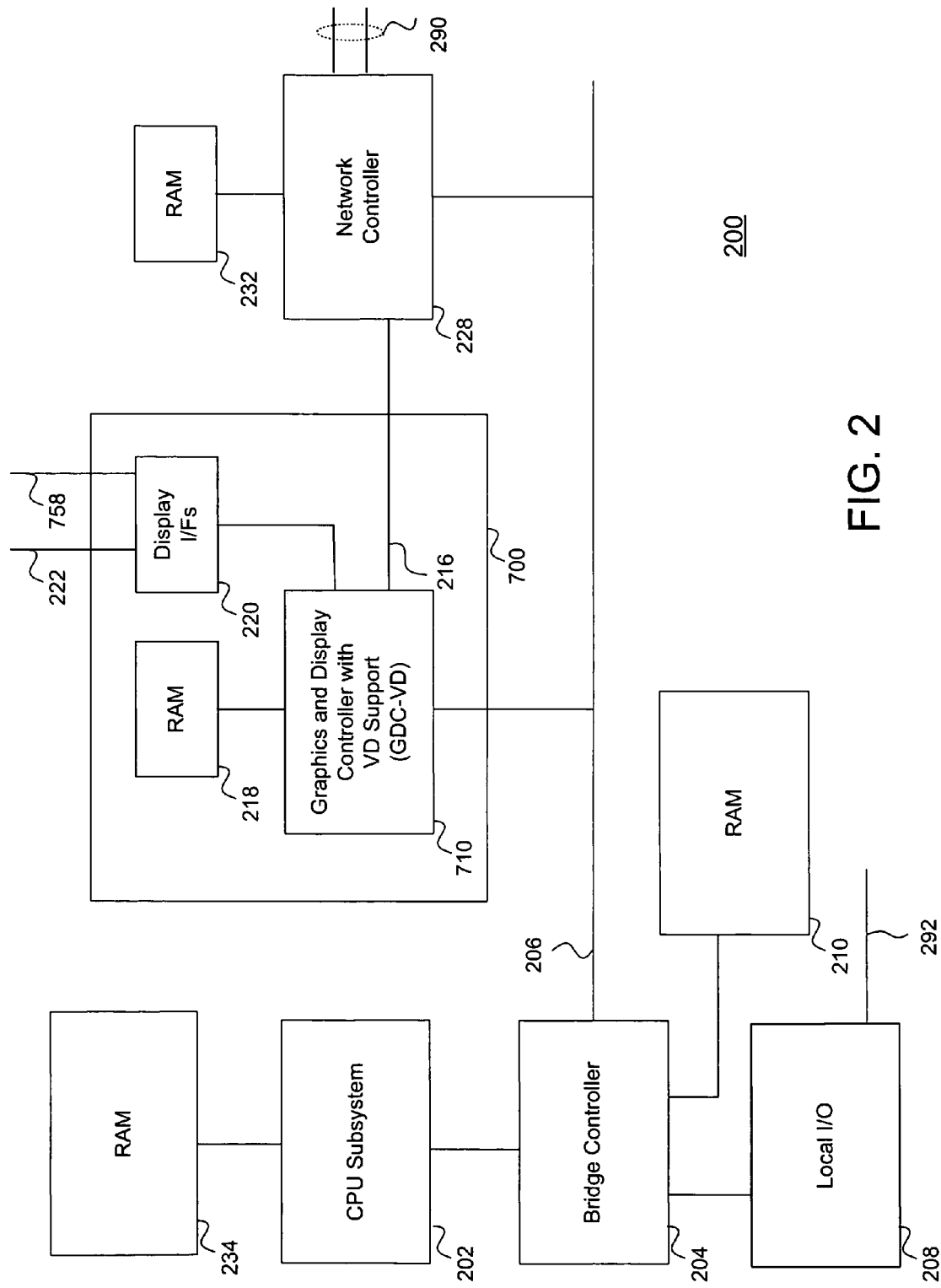
FIG. 2 is a block diagram of a multi-user RT system host computer having a Graphics and Display Controller with VD support in accordance with one embodiment of the invention.

FIG. 2 is a block diagram of a Host 200 that may be a host computer system either by itself or in the form of one blade of a server system wherein multiple blades can be racked together to create more capable host computers. Either a single blade (motherboard) system 200 or multiple blades 200 may be used for a multi-user system 100 in accordance with an embodiment of the invention. The more blades and CPUs that a host system 200 has, the more users can be supported simultaneously. The basic components of host computer 200 preferably include, but are not limited to, a CPU subsystem 202, a bus bridge-controller 204, a main system bus 206 such as PCI express, local I/O 208, other local I/O connections 292, main RAM 210 and RAM 234, and a graphics and display subsystem or "GPU Subsystem" 700. Network controller 228, which may include its own RAM 232, may include various network connections 290. Other host system configurations may centralize the I/O, network and graphics and display subsystems so that multiple CPU subsystems 202 may share them across one or more busses.

The graphics and display subsystem 700 includes a Graphics and Display Controller with Virtual Desktop Support GDC-VD 710 and may have an interface 220 that allows for local connections 222 and 758 to one or more local displays 110. GPU subsystem 700 may include one or more display interface chips 220 for generating one or more DVI, HDMI or other display signaling interfaces 222 and 758, or the signaling interfaces may be integrated directly into the GDC-VD 710. Local RAM 218 is used to manage the displays. GDC-VD 710 may have a connection 216 directly to a network controller or may use system bus 206. Virtual Desktop support, described further with reference to FIGS. 4 through 7, may include supporting multiple VMs on a single display, one or more VMs on one or more displays, translation of display sizes and frame buffer configurations, and other methods where the virtual display memory space does not directly correspond to the physical display space.

System bus 206 may connect to a backplane bus for interconnecting multiple blades in a system, or additional buses (not shown) may be included between systems. More than one network controller 228 may be included in a system where one is used for a connection 290 to multiple remote terminals RTs 300 and another network controller (not shown) performs infrastructure network connections to other blades, other server systems or other data center equipment such as storage systems. Each CPU subsystem 202 may include multiple processor cores each of which may simultaneously execute more than one thread. The processor cores may include hardware virtualization support as is found in Intel's Vanderpool Technology (VT) and Advanced Micro Devices Pacifica technology.

In another configuration of a Host 200 (not shown), the GDC-VD 710 is combined with some or all of the Bridge Controller 204 functions to provide a unified memory system. In a unified memory system, one or more RAM subsystems are accessible by both the GDC-VD 710 and the main memory controller. The GDC-VD 710 is able to perform any of the operations into any of the areas of memory. The various addressing mechanisms, including IO Virtualization, may be unified within the combined controller or may include separate mechanisms.

Figure 3:
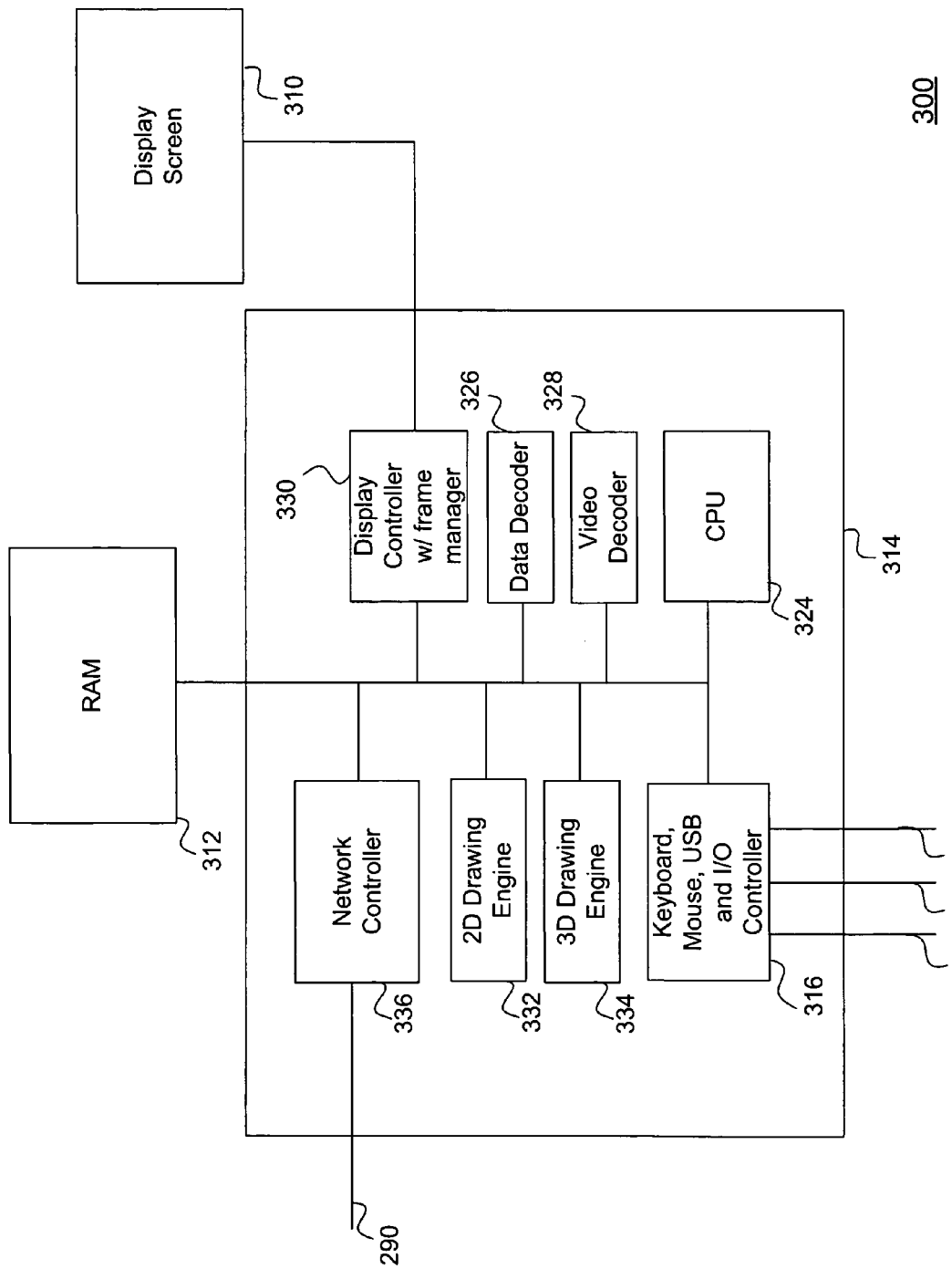
FIG. 3 shows an RT which cooperates with the host computer of FIG. 2.

FIG. 3 is a block diagram of a Remote Terminal (RT) 300, in accordance with one embodiment of the invention, which preferably includes, but is not limited to, a display screen 310, a local RAM 312, and a remote terminal system controller 314. The remote terminal system controller 314 includes a keyboard, mouse and I/O control subsystem 316 which has corresponding connections for a mouse 318, keyboard 320 and other miscellaneous devices 322 such as speakers for reproducing audio or a Universal Serial Bus (USB) connection which can support a variety of devices. Other integrated or peripheral connections for supporting user authentication via secure means, including biometrics or security cards, may also be included. The connections can be dedicated single purpose such as a PS/2 style keyboard or mouse connection, or more general purpose such as USB. In other embodiments the I/O could include a game controller, a local wireless connection, an IR connection or no connection at all. Remote Terminal system 300 may also include other peripheral devices such as a DVD drive.

Some embodiments of the invention do not require any inputs at the remote terminal system 300. An example of such a system is a retail store or an electronic billboard where different displays are available at different locations and can show variety of informative and entertaining information. Each display can be operated independently and can be updated based on a variety of factors. A similar secure system could also include some displays that accept touch screen inputs, such as an information kiosk or Automated Teller Machine (ATM) at a bank. Other secure systems, such as a game machine for a casino, could also be based on this type of RT.

Network controller 336 supports secure protocols on the network path 290 where the networks supported could be wired or wireless and the data traveling over the network can be encrypted via a key exchange. The networks supported for each remote display system 300 need to be supported by the FIG. 2 network controller 228 either directly or through some type of network bridging. A common network example is Ethernet, such as CAT 5 wiring running some type of Ethernet, preferably gigabit Ethernet, where the I/O control path may use an Ethernet supported protocol such as standard Transport Control Protocol and Internet Protocol (TCP/IP) or some form of lightweight handshaking in combination with UDP transmissions. Industry efforts such as Real-Time Streaming Protocol (RTSP) and Real-Time Transfer Protocol (RTP) along with a Real-Time Control Protocol (RTCP) can be used to enhance packet transfers and can be further enhanced by adding re-transmit protocols. Other newer efforts around using Quality of Service (QoS) efforts such as layer 3 DiffSery Code Points (DSCP), the WMM protocol as part of Digital Living Network Alliance (DLNA), Microsoft Qwave, uPnP, QoS and 802.1P are also enhanced ways to use the existing network standards.

In addition to the packets for supporting the I/O devices, the network carries the encapsulated and encoded display commands and data required for the display. The CPU 324 coordinates with the network controller 336, 2D drawing engine 332, 3D drawing engine 334, data decoder 326, video decoder 328 and display controller 330 to support all types of visual data representations that may be rendered at the host computer and display them locally on display screen 310. RTs are not required to include any particular combination of the display processing blocks. A 3D drawing engine 334 may include a pixel shader and may include a triangle shader that conform to the Microsoft DirectX specifications.

An extra thin RT may include as little as just a display controller 330 with a CPU doing the display processing, though having at least one type of decoder or drawing engine is more likely. In one embodiment, a thin RT may include a CPU and a 2D drawing engine 332 that includes support for transparency and alpha blending. Newer operating systems such as Microsoft Vista support transparency, sometimes called "Aero" or "glass" as part of the user interface. Transparency allows the user to see a background display window through a front display window. The blending of the two windows is known as transparency and may vary with different weightings. While Windows Vista performs the transparency using the 3D graphics pipeline, the effect of transparency can be approximated on the RT using an alpha blending functions or a simplified pixel shader within a 2D drawing engine. For 3D operations requiring sophisticated perspective correction and other advanced 3D operations, a full 3D controller on the host may perform the 3D operations and send the encoded tiles to the RT for decode and display.

The RT 300 can be first initialized either by booting out of a local FLASH memory (not shown) with additional information being provided over the network by the host computer 200. During the initialization sequence for the RT, the connection between the RT system controller 314 and the display screen 310 may be used in a reverse direction or bidirectional mode utilizing standards such as Display Data Channel (DDC) Interface, Extended Display Identification Data (EDID) and other extensions to identify the display monitor capabilities. A USB connection via Keyboard, Mouse and I/O controller 316 may also be used in the connection to the display screen 310. The information such as the available resolutions and controls are then processed by the CPU 324. System 300 may implement a protocol such as uPnP or another discovery mechanism where it is able to communicate with the host 200. During that initialization communication, CPU 324 may provide the RT information, including the display monitor information, to the host 200 so that each RT can be instantiated at the host side.

The operations relating to the Keyboard, mouse and the corresponding display areas for those interactive areas, such as the active typing area or the cursor, may be more user sensitive to latency than other display areas such as motion video playing as a background task. These critical operations can be treated as high priority tasks by both the RT 300 and sent over the network with higher priority than other operations. At the host computer 200, these critical operations may also be prioritized for processing by the host CPU and prioritized within the network processing stack.

The initial display screen may come from either the FLASH memory or from the host computer 200. Following a first full frame of display data, the host computer 200 need only send partial frame information over the network 290 as part of the display update network stream. If none of the pixels of a display are changed from the prior frame, the display controller 330 can refresh the display screen 310 with the prior frame contents from the local RAM storage 312.

Display updates are sent via the network stream, and may consist of encapsulated 2D drawing commands, 3D drawing commands, encoded display data or encoded video data. The network controller 326 receives the network display stream and the CPU 324 determines from the encapsulation header which of the functional units 332, 334, 326 and 328 are required for that packet. The functional units perform the necessary processing steps to draw or decode the image data and update the appropriate area of RAM 312 with the new image. During the next refresh cycle, the display controller 330 will use this updated frame for display screen 310.

The display controller 330 transfers a representation of the current image frame from the RAM 312 to the display 310. Typically, the image will be stored in RAM 312 in a format ready for display, but in systems where RAM cost is an issue, the image or portions of the image can be stored in the encoded format. External RAM 312 may be replaced by large buffers within the remote terminal system controller 314. Display controller 330 may also be able to combine two or more display surfaces stored in RAM 312 to composite an output image for display by screen 310. Different blending operations may be performed along with the compositing.

CPU 324 communicates with GDC-VD 710 to best set up and manage the overall display operations for the RT. Initial setup may include enumerating the types of functions supported in the RT system controller 314, specifications of display screen 310, amount of RAM 312 available for buffering and caching data, command set supported by the 2D drawing engine 332, command set supported by the 3D drawing engine 334, formats supported by the data decoder 326, formats supported by video decoder 328 and the capabilities of display controller 330. Other management optimizations at run time include managing and caching display bitmaps in RAM 312 so they do not need to be resent.

Figure 4:
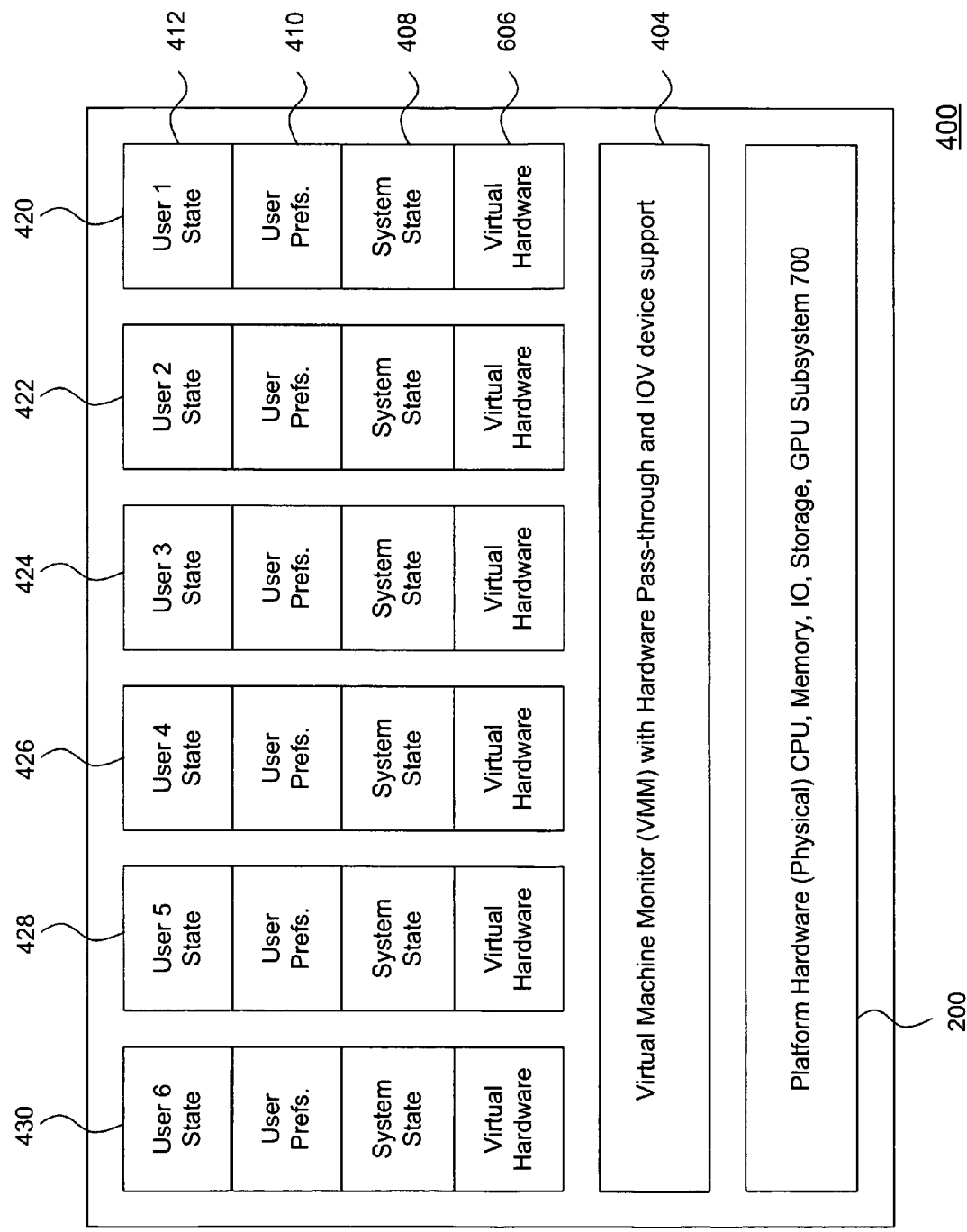
FIG. 4 represents six different Virtual Machines (VMs) running with on top of a Virtual Machine Monitor (VMM) layer which includes hardware pass-through and I/O Virtualization device support.

FIG. 4 illustrates one embodiment of a host operating environment 400 for a virtual desktop system. The platform hardware encompasses the physical hardware of host system 200 including the CPU, Memory, JO, Storage and GPU subsystems 700. Running on top of the physical hardware is the software Virtual Machine Monitor (VMM) 404 which includes the hypervisory layer of coordination for each virtual machine. The VMM 404 may be a stand alone paravirtual system or may be part of an operating system that includes a VMM 404 process. The VMM may include separate modules that operate at run time and other modules that are used during configuration of the physical platform hardware.

FIG. 4 illustrates six VMs 420, 422, 424, 426, 428 and 430 running equivalent stacks 408, 410, 412 and 606 of software. Though each is shown running the same stack, in many systems each VM may be completely different. For example, one VM may be a Linux virtual machine while another VM may be a Windows virtual machine and a third may be a virtual machine proxy for management of one or more thin clients. Each VM may either run on a shared hardware platform or be migrated to another hardware platform such as a notebook computer or desktop computer attached to the network. Additional management software could manage the VM such that only updated portions of the VM would need to be sent to the physical machine that is running the VM.

Considering the layers for each VM 420-430, starting at the bottom, Virtual Hardware layer 606 illustrates that each VM has an individualized view of the hardware 200 and operates as if it were the exclusive VM with that view of the hardware. This allows the same operating system, drivers and applications of System State layer 408 that otherwise would run exclusively on a physical hardware system, to now run as a VM on a shared VMM based system. System State 408 may be user independent such that a new System State 408 is instantiated for each user and may be related to the operating system they are running. Each user may choose to customize their desktop environment with User Preferences shown in layer 410. When a new System State 408 is instantiated, the user is authenticated and the saved User Preferences 410 that correspond to that System State 408 are loaded. User Preferences 410 may also include access rights to different files and applications as well as a set of setup and initialization files associated with various applications. User Preferences 410 may differ depending on the operating system initialized as part of the System State 408.

The User State 412 represents the current dynamic Virtual Desktop (VD) environment that the user is operating in. For example, on a typical desktop, the user may have multiple windows opened each with a different application accessing different files. The VD environment may be migrated from one RT to another as the user changes locations, so that a user in a new session can resume right where they left off in the previous session.

A single user may use multiple VMs 420-430 each of which may represent different operating systems, applications or operating environments and may run on one or more physical machines. One of the VMs may be a "presentation manager" that coordinates the different display components of the operating VMs so that the user can have a unified desktop with different windows corresponding to different VMs. One user may simultaneously run a Linux server, a Windows desktop, a multimedia VM and another type of remote session, all as VMs either locally or remotely, and a presentation manager can create a unified view of the complete user environment. Different applications running as VMs have the advantage that a VM may be migrated more easily from one machine to another for dynamic workload balancing. A unifying presentation manger may alternatively be run as an application under one of the VMs. Performance sensitive applications, such as multimedia playback, can be run as VMs so that the VMM can assure better real time response while other VMs may be running applications that are not real-time aware.

In another embodiment of the architecture of FIG. 4, the drivers for the hardware devices are part of the VMM 404. For each VM, there is a driver stub that includes the driver entry points, but the bulk of the driver is run in the VMM layer. This has the advantage of allowing a single driver code base to be shared by different OSs and different VMs. VMM drivers should be designed to be multi-VM aware and include the necessary management controls. The partitioning of which aspects of the drivers install and run at the VM layer and which install and run with the VMM are an important consideration for overall performance.

VMM 404 support can be further optimized for multi-core CPUs that may be found within CPU Subsystem 202. In one preferred embodiment, the VMM manages the multi-core CPU resources such that multimedia related workloads are performed at higher priority and with less latency than traditional computing tasks which are not so latency sensitive. Since user perceptions of performance are typically more tied to interactivity and to audio, video and display quality, prioritizing those tasks can significantly increase the perceived performance of a system. The VMM may manage each core of the CPU as a resource to be shared and may preempt the processing on one or both cores for the higher priority media processing tasks. The VMM may manage these tasks as part of a single VM or the multimedia processing may be managed as a separate VM. A separate VM can manage the scheduling of the tasks outside of any particular VM. While operating systems such as Windows have prioritization for different tasks, running a task manager as part of a VMM to manage multiple cores may provide higher efficiency and tighter control for latency sensitive tasks.

Figure 5:
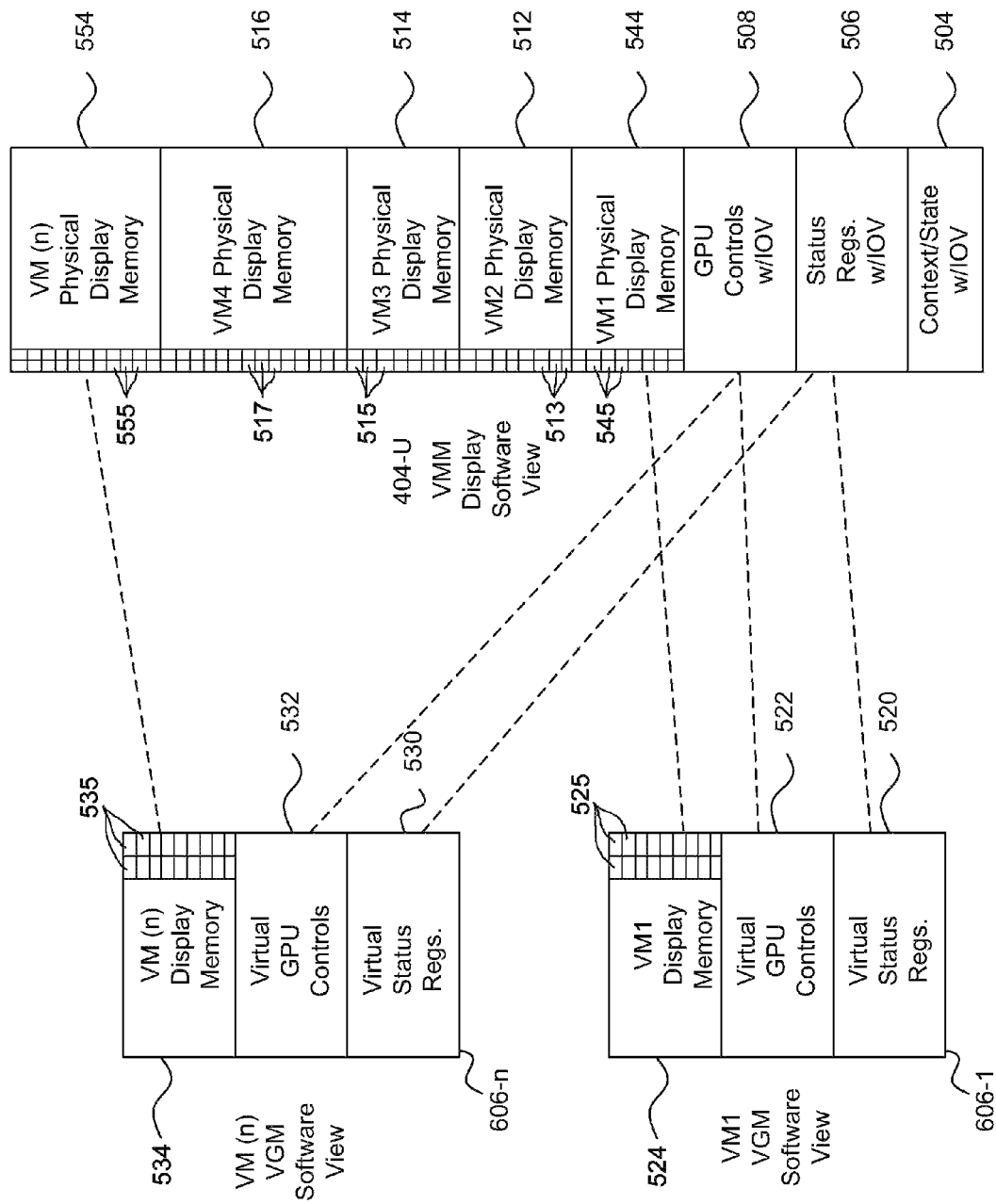
FIG. 5 represents software VMs of a virtual Graphic and Display Controller and the software view of the VMM for all VMs.

For one embodiment of the invention FIG. 4 software layers 408, 410 and 412 view the Virtual Graphics Machine (VGM) layer 606 as illustrated in FIG. 5 by view 606-1 for VM number one 420, and by view 606-n for other enumerated VMs two (422) through six (430) each of which may request the same or a similar software view. The graphics machine hardware is virtualized as a VGM in layer 606 for each VM of FIG. 4, though the VGM may alternately be installed and run as part of the VMM 404. Each VGM includes Virtual Status Registers 520 (530), Virtual GPU controls 522 (532) and Virtual Display Memory 524 (534) with subframe storage 525 (535). The reads and writes to the VGM memory are mapped to the appropriate graphics and display portion of the VMM 404 which coordinates the different VGM commands and maps them onto the physical hardware. The VMM may coordinate the accesses in real time or may set up various translation services as part of the GDC-VD 710, within the Bridge Controller 204 or with a combination of hardware and software.

FIG. 5 also represents a unified view 404-U of one embodiment of the graphics and display portion of the VMM 404 (where one or more GPUs have been virtualized to each support one or more displays) as it interfaces and maps the different VGMs 606 onto physical graphics hardware GPU subsystem 700 that may either be part of the host system 200 or may be part of the RTs 300. The different elements shown in view 404-U may be either software managed by a VM 420-430, VMM 404 or may correspond to hardware within the physical graphics and display hardware systems. In general, the more closely mapped the VGM is to the physical hardware, the less work is required by the VM and VMM software drivers and the higher the performance for the system is likely to be.

In coordinating the different asynchronous VGMs 606, the VMM 404 tracks the Context and State information 504, which may include the basic configuration information such as resolution and color depth and may also include the complete GPU and display windowing information, for each VGM. The GPU status registers 506 for one or more GPUs are tracked and coordinated with the GPU Controls 508. Since the different VMs will generate Virtual GPU Controls 522 asynchronously, the VMM 404 needs to assure that it achieves the proper ordering and interleaving of the GPU commands to the physical hardware 200. For example, most drawing commands require that multiple source and destination registers be set before the drawing execution command is sent. The system must assure that the complete drawing command is performed as an atomic operation without corruption by another VM. Assuring operations are not corrupted can be done with various combinations of FIFOs, resource shadowing or aliasing and otherwise isolating the commands from different VMs.

While the graphics drawing hardware of a single GPU subsystem 700 may be shared between VMs, each VM may be allocated a physical portion of display memory that remains private to that VM. VM1 Display Memory 544 is at a physical address different from VM2 Display Memory 512 through VM(n) Display Memory 554. Display memories may be provided with respective subframe storage areas: VM1 524 with subframe memory 525, VM(n) 534 with subframe memory 535, and physical display memories VM1 544 with subframe memory 545, VM2 512 with subframe memory 513, VM3 514 with subframe memory 515, VM4 516 with subframe memory 517, and VM(n) 554 with subframe memory 555. A GDC-VD 710 designed for supporting multiple VMs can include hardware partitioning to protect each VM Display Memory address space from access by other VMs. This protection would include protecting accesses directly or by the drawing engine to the display memory so that one VM's drawing commands could not affect another VM. The GDC-VD 710 hardware isolation may be designed such that the VMM accesses each VM's display memory starting at address zero or the VMM may perform an offset calculation in software. As an example, assuming that each VM makes use of an 8 MByte display memory, each VM would address the origin pixel of the screen at location zero. If the GDC-VD 710 hardware supported multi VM contexts, the VMM would address the origin pixel for the second VM at location zero, where the context and state 504 (FIG. 5) had been set such that the GDC-VD 710 would translate location zero to the first pixel of the second VM's 8 MByte display memory. Alternatively, the VMM, knowing that it was operating on the second VM's display memory, would add the 8 MByte offset to the zero pixel to address the origin pixel for the second VM.

For each embodiment the VMM and GPU hardware must assure that accesses and commands from each VM are isolated from each other. In another embodiment, the address translation may be performed within a Bridge Controller 204. More sophisticated mapping of drawing commands within the GDC-VD 710, described below with respect to FIG. 6, requires a more sophisticated mapping mechanism which typically can not be handled by a Bridge Controller 204. Mapping within the Bridge Controller 204 is also useful for translating bus mastering operations from other devices in a system and is also useful for translating address accesses within a unified memory system where the GPU subsystem RAM 218 is shared with the System RAM 210

In the example where one or more of the RTs 300 includes a 2D Drawing Engine 332 or 3D Drawing Engine 334 with some amount of graphics and decode capability, the VMM 404 is able to translate the VGM 606 commands of the corresponding VM into the appropriate combination of local and remote commands. For example, for on-screen drawing operations that are supported by the RT, the VMM can encapsulate and send the commands over an appropriate network interface. In another preferred embodiment, the VMM utilizes the host 200 graphics capabilities to perform graphics operations at the host and then provide the modified regions of the screen to the remote terminal 300 as an encoded bitmap transfer. This concatenating of graphics operations into encoded transfers can improve the overall system performance and is particularly useful when the graphics operations are off-screen operations that would otherwise be overwritten. In one preferred embodiment, a 3D graphics controller 710 renders a full frame into an off-screen buffer which typically requires a large number of overwrites. This off-screen buffer is switched to be the front on-screen buffer and at that time the front buffer content is encoded and transmitted to the RT.

For VM1 606-1, the VM1 display memory 524 may pass through in a very direct way and be mapped to the VM1 display 544. Various methods may be used to perform address translation, which is required to bridge between virtual address spaces and physical address ranges. For example, each VM may assume its frame buffer starts at virtual address A0:0000. The VMM may chose to map the VMs to addresses A0:0000, A1:0000, A2:0000 and so on. Various mechanisms may be used to perform this mapping. The CPU Subsystem 200, the System Controller 204 or the GDC-VD 710 may each include hardware VM support to allow the VMM to control the translation for each VM.

Address translation may be performed as part of the system chipsets which support I/O Virtualization (IOV). IOV support may also be required for Bus Mastering I/O devices in a system where address translation within the CPU Subsystem 200 can not be used, as the I/O devices themselves are generating the addresses. While some I/O devices can be designed to support multiple VMs, the system chipset may be designed to assist bus mastering devices in performing address translation for the different VMs and for multiple IO devices which may or may not comprehend IOV techniques.

Figure 6:
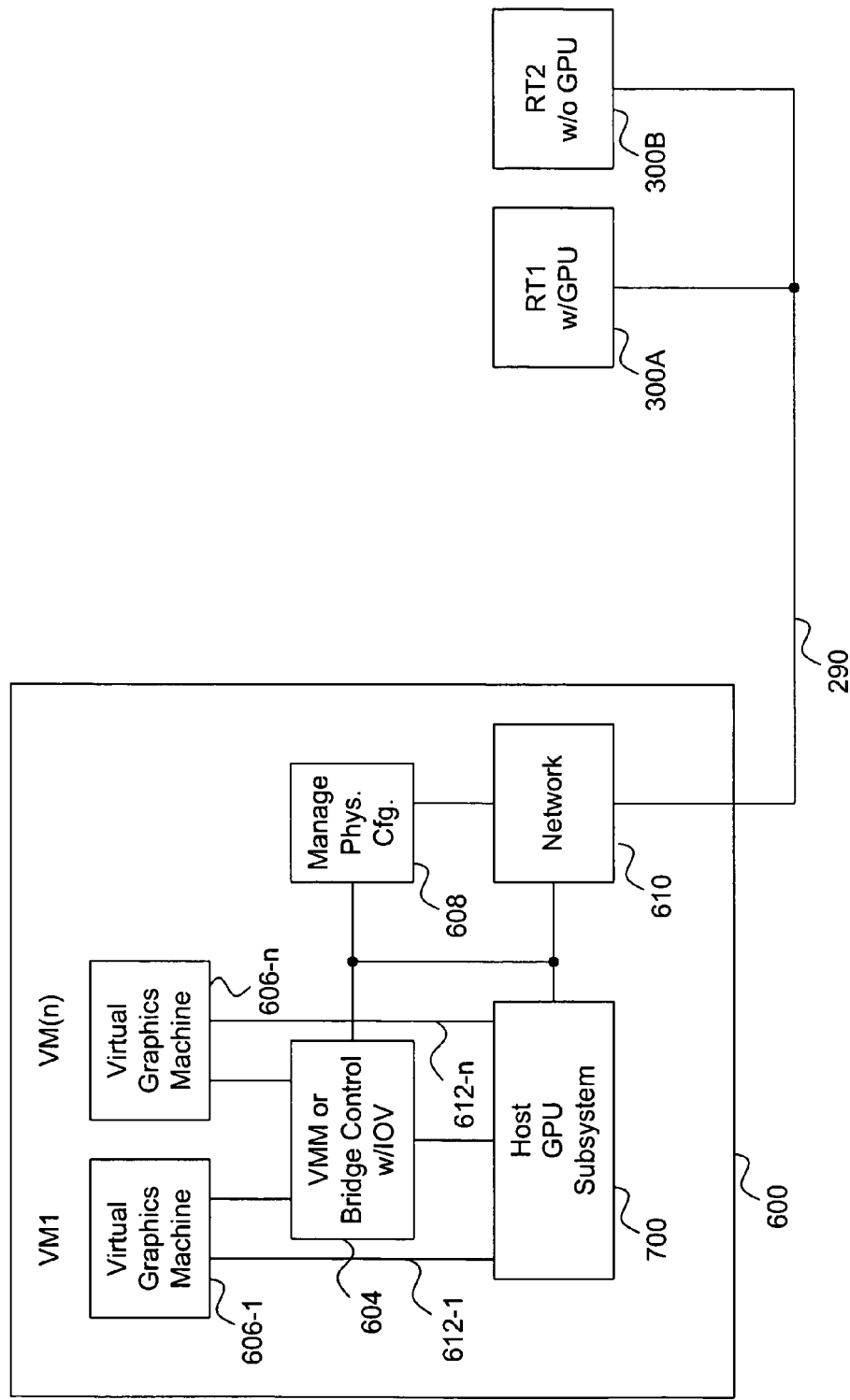
FIG. 6 is a block diagram of an exemplary host virtual and physical Graphics and Display Controller configuration and the network connection to two types of client devices.

FIG. 6 shows a host system 600 which supports virtual desktops for more than one type of RT 300A or RT 300B. The virtual desktop support 600 includes support for VM1 and the associated Virtual GPU 606-1 and additional VMs as indicated by VM(n) and Virtual GPU 606-n. There are three paths from the VMs to the hardware Host GPU 700.

The first path is the Manage Physical Configuration 608 path which is used at configuration time and for operations that do not occur in a performance path. Configuration operations may include setting up address translation tables either locally or as part of an IOV chipset, setting up interrupts or other configuration operations. During run time, the Manage Physical Configuration 608 path may be used for interrupt processing and for graphics operations that require some form of translation. In one example, the address ranges for setting up GPU 700 drawing registers may need to be translated during command setup. Such a translation may require the VMM software to dynamically adjust the register values based on which VM is accessing the GPU 700.

The second path is a pass-through mode through the VMM 604 where a minimal level of software and hardware is used by the hypervisor software. This is the fast path and is ideally used at run time for performance oriented operation By providing the configuration operations of the Manage Physical Configuration 608 block separately on the first path, the pass-through modes may achieve higher performance. One example may include address translation registers as part of the CPU subsystem 202 or as part of the chipset IOV 204 that is managed by the VMM. In some cases, the run time address translation within the IOV 204 may be equivalent to address translation that may be performed in the third path. Third path, 612-1 and 612-n, connects directly between the VM and the Host GPU 700. In this direct mode, the hypervisor software is avoided altogether. To facilitate the direct connect mode, the hypervisor software may configure the virtualization hardware so that each VM can then directly access the GPU 700. Alternatively, a driver running at the hypervisor layer may perform all of the controls for the GPU 700. Other direct access support may be included as part of the GDC-VD 710 and may include shadow registers, address translation, memory translation or other similar techniques to allow direct access by the various VMs.

The network 610 may be accessed both during setup procedures and during real time operations and is primarily responsible for connections to the various clients. The clients may include RT1 with GPU 300A and RT2 without GPU 300B. The different clients may be managed differently by the hypervisor which controls the VMM with pass through 604 and the Manage Physical Configuration 608. For example, for RT2 without GPU 300B, the hypervisor would direct all graphics commands through the host GPU 700 so that the network 610 would include block data transfers that were suitable for decode and display. Alternatively for RT1 with GPU 300A, the hypervisor may intercept some of the graphics commands and instead of having them executed on the Host GPU, have the network 610 transfer the GPU command for execution on RT1 300A.

In another preferred embodiment, a display manager can be used to combine various VMs and VM application windows into enhanced displays for different RTs. Typically each of the VMs consists of one or more applications and drivers that access a Virtual GPU in a high performance manner. The applications typically run in user mode and the driver may run in either user mode, operating system mode, or a combination of the two. Each application may also assume that it has full access to one or more windows of the display. A display manager within the VM or operating as a separate VM may manage the different requests from the different applications and drivers. Each of the VM display managers may assume a full display software view 606-n as shown in FIG. 5 or may manage the a unified display using another technique.

The VMM display software view may be used in order to transfer a defined virtual machine state from the host where the defined virtual machine may be each of the VMs 420-430, to a corresponding RT 300. Alternatively, a preferred embodiment the VMM 404 may include a display manager that can be used to combine various VMs and application windows of the VMs to produce new and unique display representations for the RTs. Alternatively, a Super-Display manager (not shown) may run as a separate VM and make calls to the VMM. In either case, the RTs are able to have a unified display environment where the different windows within the display may be run from different applications on different VMs. This approach can be extended for the Super-Display Manager to support this approach across not only VMs, but across different hardware machines. The Super-Display manager is able to maintain the high performance of the VMs by utilizing the hardware and the driver interfaces with a minimum amount of software intervention.

Figure 7:
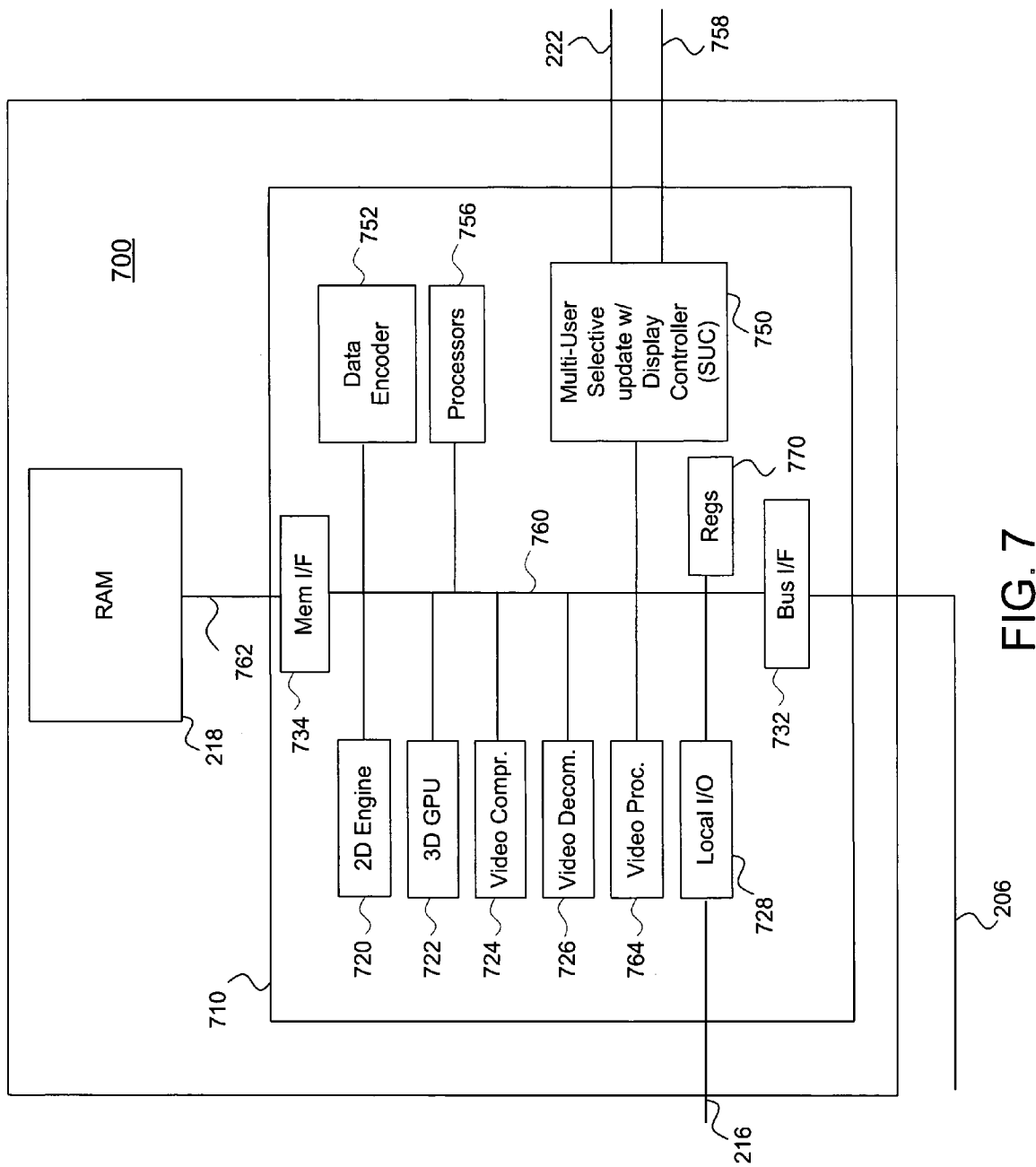
FIG. 7 is a block diagram showing details of an exemplary Graphics and Display Controller with VD support as utilized in FIG. 2.

FIG. 7 shows a preferred System-On-Chip (SOC) integrated circuit embodiment of a host GPU subsystem 700 or GPU 700 that encompasses the Graphics and Display controller with Virtual Display Support (GDC-VD) 710 along with the associated RAM 218. GDC-VD 710 combines multi-user display capabilities with Virtual Machine Monitor (VMM) support as well as the graphics and drawing functions typically found in a computer system.

In a preferred embodiment, the SOC GDC-VD 710 includes a 2D Engine 720, 3D Graphics Processing Unit (GPU) 722, a Video Compression unit 724, Video Decompression unit 726, Video Processor 764, Data Encoder 752 and other processors 756. The units may be separate or combined and may be implemented with hardwired controls, configurable functional units or as a fully programmable solution. The system bus 760 is illustrative of the connections between the various processing units as well as the system bus interface 732 and memory interface 734. Bus Interface 732 provides a connection to an external bus 206 which may be implemented as PCI Express. Memory Interface 734 may include one or more busses 762 which connect to external RAM 218. Another preferred embodiment may include RAM 218 as part of the SOC 710. The system bus 760 may support various forms of arbitrated transfers and may also have direct paths from one unit to another for enhanced performance. Registers 770 may be shared between the units or may be dedicated for each functional unit. Local I/O interface 728 may support direct connections 216 to external peripherals, a network controller or to one or more display input busses (not shown).

The Multi-User Selective Update with Display Controller (SUC) 750 may include outputs 222 and 758 for local displays, though the remote multi-display aspects are supported over the system bus 206 or potentially a direct connection 216 to the network controller 228. In a preferred embodiment, SUC 750 supports multiple virtual displays without additional run time software management by a hypervisor or VMM. By supporting a combination of translations and mappings of registers and memory, each VM may utilize the GDC-VD 710 with minimum software overhead. Translations and mappings that are performed in a system chipset for IOV during memory accesses from external agents over system bus 206 may also need to be performed within the GDC-VD 710 for accesses that occur within the graphics and display subsystem 700.

The RAM 218 may store a either an uncompressed or a compressed version of the display memory contents. When an uncompressed version is stored in the RAM 218, the various operation units of the GDC-VD 710 can operate in a traditional bit mapped mode and the SUC 750 may perform the compression before sending updates to the remote displays 300. Alternatively, the RAM 218 may store a compressed version of the display memory contents where the GDC-VD 710 operates on compressed mode bit maps. A hybrid approach may be used where the bit map is stored in a semi-compressed mode that is suitable for GDC-VD 710 operations, but is then further compressed by SUC 750.

The GDC-VD 710 may access the RAM 218 using various addressing sequences to match the addresses required for different graphics operations. The SUC 750 is typically accessed in a raster scan manner of accessing one or more lines of the display in order. Then, lines, blocks or slices (multiple lines) are compressed as a group. Typically it is more efficient and higher compression ratios can be achieved by performing the compression across larger groups of pixels.

When graphics operations are performed in the compressed domain, it may be necessary for operations that would otherwise be just write operations, to be modified to be read-modify-write operations where the block of data that is operated on for compression is read as part of the operation.

Compressed frame buffers may also be used to support very large resolution local displays. The contents within the frame buffer may be stored in a compressed format and the various graphics operations may occur in the compressed domain. The data may be decompressed in the path from the frame buffer to the display monitor with the actual decompression being performed at any number of potential places. For example, in one embodiment, the decompression occurs in the display refresh path. Since the refresh rate for the entire display may be too high a data rate, the refresh path may be used to update at content frame rates of 24 or 30 Hertz. In such a case, the display itself may include a mechanism to refresh the display pixels at 60 Hertz or higher in order to avoid screen flicker effects.

In another preferred embodiment, the GDC-VD 710 performs multiple operations and then, when the frame or sub-frame is rendered, the SUC 750 will update that frame or sub-frame with an encoded transfer to the remote display. Even if the graphics operations could be performed by one of the graphics engines in the controller 314 of RT 300, it may be more efficient to perform the graphics operations by the GDC-VD 710 at the host. For example, with a 3D graphics scene, each pixel of the display may be written multiple times. This is due to the "depth" of a scene where some objects are rendered only to be overwritten by pixels of objects that are closer to the viewer. 3D rendering commands themselves may include a significant amount of data to describe the coordinates and data values. Performing the 3D commands locally on the Host 200 reduces the amount of command traffic that is transmitted over the network connection.

To avoid displaying the intermediate scene renderings, 3D scenes are typically rendered into a back buffer out of view and then switched to the foreground. The mechanism to switch a fully rendered scene from the back buffer to the front buffer can be used as the mechanism to determine when the buffer is to be encoded and transmitted to the remote display. Transmitting only the final rendered buffer surface conserves the bandwidth over the link from the host to the client. This conservation occurs by both reducing the number of graphics commands that are sent in the case of using a remote GPU and reducing the number of unique bitmaps by collapsing what would otherwise be intermediate results into one final buffer.

The Data Encoder 752 may include support for one or more types of encoded data. Since different RTs may have different decode capabilities, it may be more optimal to encode different data for different RTs in a different algorithm. For example, one RT 300 may have an H.264 based decoder that includes a hardware Context-based Adaptive Binary Arithmetic Coding (CABAC) block. For such an RT, video data may be encoded by the Data Encoder 752 using H.264. Graphics data may be encoded using a wavelet transform that utilizes CABAC as the coding core. A different RT may be designed to include a decoder for Wavelets using an Embedded Block Coding with Optimized Truncation (EBCOT) arithmetic decoder. In that case, the Data Encoder 752 would use EBCOT-based Wavelet encoding. Additional optimizations for differential encoding, motion prediction and other block based temporal techniques can also be accounted for in determining how to best match the operations of the Data Encoder 752 with the capabilities of the target RT 300.

A tracking software layer can also be used to assist in the encoding choice for display frames and subframes that have changed and require generation of a display update stream. As stated previously, the encoding is performed to reduce the data required for the remote display system 300 to regenerate the display data generated by the host computer's graphics and display subsystem 700. The tracking software layer can help identify the type of data within a surface and translate the surface into a portion of the display frame. That portion of the display frame, whether precinct based or scan line based encoding is used, can be identified to the display data encoder 752, as to allow the most optimal type of encoding to be performed.

For example, if the tracking software layer identifies that a surface is real time video, then an encoding scheme more effective for video, which has smooth spatial transitions and temporal locality, can be used for those areas of the frame. If the tracking software layer identifies that a surface is mostly text, then an encoding scheme more effective for the sharp edges and the ample white space of text can be used. Identifying what type of data is in what region is a complicated problem. However, this embodiment of a tracking software layer allows an interface into the graphics driver architecture of the host display system and host operating system that assists in this identification. For example, in Microsoft Windows®, a surface that utilizes certain DirectShow commands is likely to be video data whereas a surface that uses color expanding bit block transfers (Bit Blits) normally associated with text, is likely to be text. Each operating system and graphics driver architecture will have its own characteristic indicators. Other implementations can perform multiple types of data encoding in parallel and then choose to use the encoding scheme that produces the best results based on encoder feedback.

Some types of encoding schemes are particularly more useful for specific types of data, and some encoding schemes are less susceptible to the type of data. For example, RLE is very good for text and very poor for video, DCT based schemes are very good for video and very poor for text, and wavelet transform based schemes can do a good job for both video and text. Though any type of lossless or lossy encoding can be used in this system, wavelet transform encoding, which also can be of a lossless or lossy type, for this application will be described in some detail. While optimizing the encoding based on the precinct is desirable, it can not be used where it will cause visual artifacts at subframe boundaries or create other visual problems.

Figure 8:
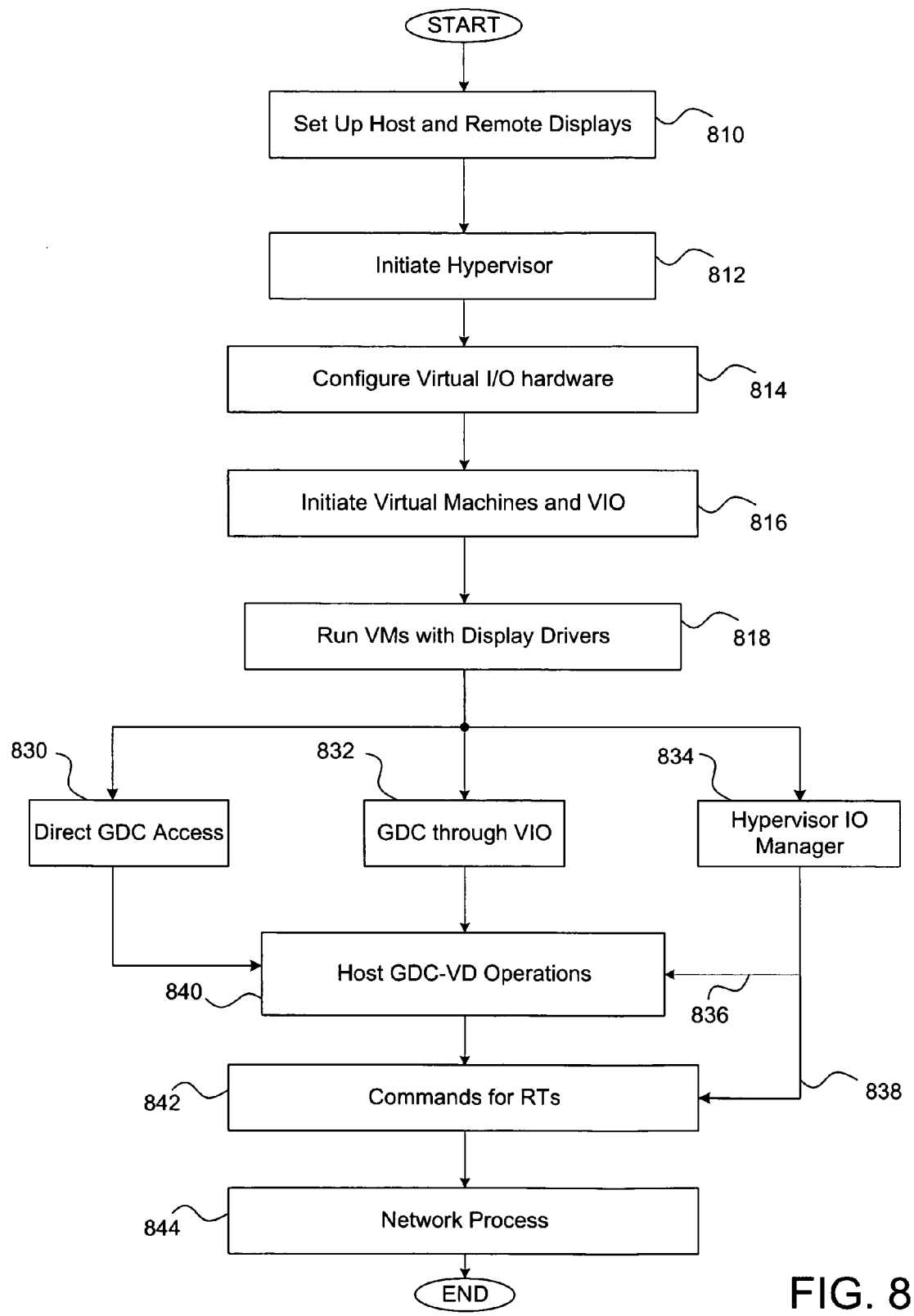
FIG. 8 is a flowchart of steps in a method for performing virtual desktop host operations in accordance with one embodiment of the invention.

FIG. 8 is a flowchart of method steps for performing the virtual desktop system host operations and more particularly the steps of initiating and configuring the Virtual Machine Monitor (VMM) 404 with virtual I/O support for the display systems and the steps that the VMs perform relative to the graphics operations in accordance with one embodiment of the invention. For the sake of clarity, the procedure is discussed in reference to display data including video. However, procedures relating to audio, keyboard, mouse and other data are equally contemplated for use in conjunction with the invention.

Initially, in step 810, multi-user server based computer 200 and remote terminal system 300 follow the various procedures to initialize and set up the host side and terminal side for the various subsystems to enable each RT. In step 812, the hypervisor layer of VMM 404 software on the host 200 is initialized and then in step 814 the VMM configures the appropriate Virtual IO hardware. Virtual IO hardware may be included in one or more parts of the CPU Subsystem 202, Bridge Controller 204, Local I/O devices 208 as well as the GPU subsystem 700. The host system 200 may or may not utilize a resident host GPU or virtual frame buffer for performing RT graphics operations. Virtual IO hardware may include various hardware such as address translation hardware, register shadowing and interrupt processing, and the hardware may be set up once or continuously monitored and managed by the VMM. Typically higher performance is achieved when the VMM can configure the Virtual IO hardware support once and each VM can then freely operate on the IO device without regard to the other VMs or the virtual environment.

In step 816 the various VMs 420-430 are initiated. Each VM may be a single or multi user operating system and each VM may use a different type of operating system. Other VMs may operate as proxy agents for a single VM or for multiple VMs. A proxy agent may include a display manager that combines windows from one or more local VMs as well as from other network connected machines to present a unified display for a given RT. In step 818, the VMs each perform whatever display functions are requested of them. At this stage, the VM display operation may go through one of three paths. In the most direct path, the VM display operation is directly communicated to the GPU 700 via path GPU Direct 830. This method can be used where no real time translation is required by the VMM from the VMs to the GPU hardware. This path may include address translation performed within the GPU subsystem 700 which may have been configured earlier by the VMM.

In a slightly less efficient second path 832, the VM display operation passes to the GPU via a path that is managed by the VMM mechanics. This path may include IO Virtualization within the Bridge Controller 204 which operates at high efficiency. The third path is the VMM managed path 834 where the VMM Managed Physical Configuration 608 mediates via path 836 a command, with or without translation, to either the GPU Subsystem 700 or bypassing the host GPU subsystem 700 via path 838 to the RT 300. In certain cases it may be more efficient for graphics operations to be performed at the RT 300 than with the host GPU 700.

While a simple form of address translation from the CPU Subsystem 202 to the display memory may be performed within the Bridge Controller 204 in step 832, more complex address translation that involves GPU display operations will typically need to be performed within the GDC-VD 710 itself in step 840 or by the VMM software. For example, a screen-to-screen block transfer command from the screen origin to somewhere else on the screen requires both the block transfer source and destination addresses to be modified for each block read and write. Since the addresses are generated within the GDC-VD 710, it is more efficient to include the address translation within the GPU instead of using the Bridge Controller 204. The address translation may be done in software by the VMM which would program the GDC-VD 710 with modified addresses for the display operations or the GDC-VD 710 itself may include hardware to perform the address translation based on which VM requested the display operation. The address translation hardware may be part of the drawing hardware during the programming stage, or may be part of the memory interface 734.

In step 842, the commands that bypassed the GDC-VD 710 via path 838, and drawing commands that have been aggregated in step 840, are translated into commands for the RT 300. One example of a bypassed command via path 838 is a bit block transfer where all of the source data is already resident on the RT 300. In such a case, particularly for a large transfer, it is more efficient to send the bit block transfer as a command rather than performing the command at the host GDC-VD 710 and transferring the encoded results. In a second example, a series of GDC-VD 710 operations such as 3D overwrites into an off-screen buffer are aggregated into a single transfer command of the final buffer results. The transfer can be triggered at the same time the off-screen buffer is "swapped" to become the onscreen active buffer. In step 844, the resulting commands from each of the paths are managed by the network controller 228 and transmitted to various RTs 300.

Figure 9:
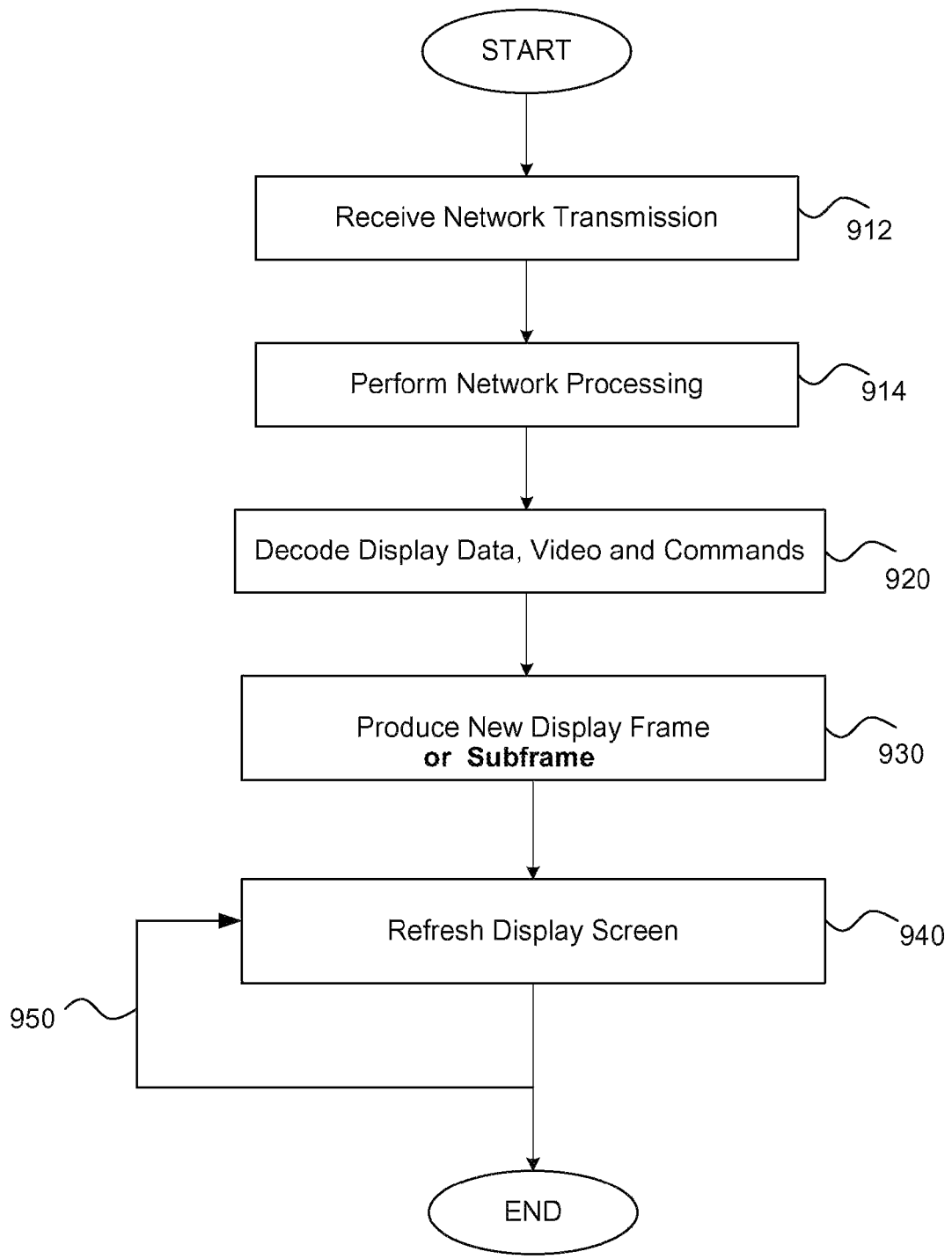
FIG. 9 is a flowchart of steps in a method for performing a network reception and display procedure for a remote terminal, in accordance with one embodiment of the invention.

FIG. 9 is a flowchart of steps in a method for performing a network reception and display procedure in accordance with one embodiment of the invention. For reasons of clarity, the procedure is discussed in reference to display data including video. However, procedures relating to audio and other data are equally contemplated for use in conjunction with the present invention.

In the FIG. 9 embodiment, initially, in step 912, remote terminal 300 preferably receives a network transmission via path 290 from host computer 200. Then, in step 914, network controller 336 preferably performs a network processing procedure to execute the network protocols to receive the transmitted data whether the transmission was wired or wireless.

In step 920, CPU 324 interprets the incoming transmission to determine which functional unit the transmission is intended for. If the incoming transmission is a 2D graphics command, then CPU 324 will initialize an operation via 2D drawing engine 332; if a 3D command then 3D drawing engine 334; if a video data stream then video decoder 328; and if an encoded tile of data then data decoder 326. Some drawing commands may make use of both the drawing engine and the data decoder 326.

A varied number of commands and data transfers may take place and the various functional units operate and preferably manipulate the data information into an appropriate displayable format. In step 930, the manipulated data from each of the functional units is assembled via frame manager 330 and may produce an updated display frame into RAM 312. The updated display frame may include display frame data from prior frames, the manipulated and decoded new frame data, and any processing required for concealing display data errors that occurred during transmission of the new frame data.

Providing a complete 3D processing pipeline within the RT 300 may cause the cost and complexity of the CPU 324 and 3D drawing engine 334 to exceed the desired goals. Properly performing the full 3D pipeline often requires transform and setup processing of the triangle or mesh data. In one preferred embodiment of the system 200, 3D processing that requires triangle or perspective shading is performed by a host GDC-VD 710 at the host while any simpler drawing functions, including drawing that requires support for alpha blending, is performed at the RT 300 by either a 3D drawing engine 334 or an enhanced 2D drawing engine 332. For an operating system such as Microsoft Vista®, the Aero modes for the desktop display can be supported in hardware at the RT 300 while any 3D games would be processed at the host 200 by the GDC-VD 710 and transmitted to RT 300 as encoded data.

Finally, in step 940, display controller 330 provides the most recently completed display frame data to remote terminal display screen 310 for viewing by a user of the remote terminal system 300. Display refresh is an asynchronous operation typically operating at 60 to 72 times per second between remote terminal controller 314 and display 310 to avoid flicker. Producing new display frames in step 930 will typically occur significantly less often, though when necessary may occur at 30 or more frames per second. In the absence of either a screen saver or power down mode, the display processor will continue to update the remote display screen 310 with the most recently completed display frame, as indicated with feedback path 950, in the process of display refresh.

The present invention therefore provides an efficient architecture for a Virtual Desktop (VD) system in a Virtual Machine Monitor (VMM) operating environment where one or more host computer systems supports one or more remote display systems with interactive graphics and video capabilities. The graphics processing for the host system can be virtualized in a variety of ways and may include Virtual IO support for efficient operation of multiple VMs. Users with RTs containing varied capabilities may flexibly utilize the host computer of a multi-user system 100 to achieve the same level of software compatibility and a similar level of performance that the host system could provide to a local user. Therefore, the present invention effectively implements a flexible multi-user system that utilizes various heterogeneous components to facilitate optimal system interoperability and functionality.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

I claim:

1. A multi-user host computer system for supporting multiple active remote terminals each having their own physical input controls, comprising:
    a hardware graphics and display subsystem (GPU) having
        display memory which can store display frames or subframes for multiple active remote terminals and which is accessible to the GPU without the need to perform a GPU context switch;
        one or more drawing engines for generating display frames which may each correspond to a display frame at one of said remote terminals;
        tracking means for tracking modified display subframes and for performing selective updates of subframes from said display memory based on this tracking; and
        means for isolating virtual machines from each other;
    a host CPU
        for running more than one CPU virtual machine each of which
            corresponds to a virtual desktop for a different user,
            includes a virtual graphics machine having virtual GPU status registers, virtual controls and virtual display memory, and
            asynchronously generates virtual GPU operations for execution by the physical GPU hardware as if the virtual machine had an exclusive machine view of the hardware GPU;
        for running a Virtual Machine Monitor which tracks context and state information for each of said virtual graphics machines and their asynchronous operations and achieves proper ordering and interleaving of said virtual GPU operations to the physical GPU hardware; and
        for controlling access by said remote terminals to said CPU virtual machines;
    means for connecting said graphics and display subsystem to said host CPU;
    means for connecting said multiple active remote terminals via a network to said host CPU;
    means for more than one of said virtual machines to asynchronously access said hardware graphics and display subsystem whereby address translation is performed between the CPU virtual machines and GPU display memory, between the GPU subsystem and the GPU display memory, and between the CPU virtual machines and GPU control registers; and
    means for managing the selective updates from said GPU display memory by the host CPU so that only the selective updates of said subframes will be transferred via a network subsystem to corresponding ones of said remote terminals.

2. The system of claim 1 wherein each of said virtual machines is able to directly read and write to controls within registers of the hardware GPU and to physical memory within the GPU subsystem that are translated (virtualized) and tracked by the virtual machine monitor to correspond to the context of said virtual machines, and wherein said virtual machine monitor tracking the context and state information replaces a need for the GPU to be context-switched when the GPU is changed to accessing GPU registers and display memory areas that correspond to different virtual machines and different remote terminals.

3. The system of claim 1 wherein said graphics and display (GPU) subsystem manages multiple physical display contexts and translates asynchronous commands from said virtual machines into commands to operate on a respective area of said physical display memory which corresponds to each display context without having to perform a context switch of the hardware GPU.

4. The system of claim 1 wherein said graphics and display subsystem manages multiple physical display contexts each corresponding to a virtual machine and protects the physical display contexts from being accessed by a virtual machine that does not correspond to that physical display context.

5. The system of claim 1 wherein said graphics and display subsystem includes hardware which, with lossless or lossy compression, encodes said modified display frames or subframes from each virtual display memory before they are transferred via said network subsystem to said remote terminals.

6. The system of claim 1 wherein said graphics and display (GPU) subsystem combines frames or subframes from more than one of said virtual machines to produce a combined frame, and transmits said combined frame with said selective updates to said remote terminals and wherein multiple simultaneous virtual machines for one or more combined displays are controlled by one or more remote users.

7. The system of claim 1 wherein a hypervisor running on said host computer system intercepts some or all graphics drawing commands from CPU virtual machines and, instead of running said graphics drawing commands on said graphics and display GPU, forwards graphics drawing commands, and wherein said remote terminals are equipped with appropriate graphics processing hardware.

8. A graphics and display controller for supporting multiple virtual machines, multiple active remote terminals and multiple user inputs, comprising:
    physical display memory which can store display frames or subframes for said multiple active remote terminals and which includes means of isolating the physical display memory between different virtual machines;

one or more hardware drawing engines for concurrently generating display frames or subframes which may each correspond to a display frame or subframe at one of said remote terminals;

one or more compression engines for performing lossy or lossless encoding and compression of said frames or subframes;

tracking means for tracking modified display subframes and for performing selective updates of subframes from said display memory based on this tracking;

means for connecting said controller to a host CPU that
runs more than one CPU virtual machine each of which corresponds to a virtual desktop for a different user,
includes a virtual graphics machine having virtual GPU status registers, virtual controls and virtual display memory, and
asynchronously generates virtual GPU operations for execution by the physical GPU hardware as if the virtual machine had an exclusive machine view of the hardware GPU;
runs a Virtual Machine Monitor which tracks context and state information for each of said virtual graphics machines and their asynchronous operations and achieves proper ordering and interleaving of said virtual GPU operations to the physical GPU hardware; and
controls access by said remote terminals to said CPU virtual machines; and for translating memory and control accesses from the CPU into context specific operations for virtual machine displays without requiring said graphics and display controller to perform a context switch;

virtual machine monitor means for allowing more than one of said virtual machines to asynchronously access said graphics and display controller without said virtual machines performing software address or control translations to support said graphics and display controller and without the controller having to switch contexts between accesses by said multiple virtual machines; and means for managing the selective updates from said display memory so that only the selective updates will be transferred via a network subsystem to corresponding ones of said remote terminals.

9. The controller of claim 8 wherein each of said virtual machines is able to read and write to an area of said physical display memory based on a virtual display memory address that at run time is translated in hardware to a corresponding physical display memory address, and wherein the host CPU has a main memory that is physically separate from said physical display memory and the main and display memories are controlled by different memory controllers.

10. The controller of claim 8 wherein said controller manages multiple physical display contexts and translates asynchronous commands from said virtual machines into commands to operate on respective areas of said physical display memory which correspond to each said display context without the need for the GPU to perform a full context switch or change its context registers between operations from different virtual machines.

11. The controller of claim 8 wherein said controller manages multiple physical display memory regions each corresponding to a virtual machine and performs synchronization to maintain proper ordering of execution and memory accesses for each virtual machine.

12. The controller of claim 8 comprising hardware which, with lossy or lossless compression techniques, encodes said modified subframes before they are transferred via said network subsystem.

13. The controller of claim 8 wherein said controller combines frames or subframes from more than one of said virtual machines, said more than one virtual machines being controlled by a remote user with a dedicated physical input device to produce a combined frame and transmits said combined frame with said selective updates via said network subsystem to corresponding ones of said remote terminals.

14. The controller of claim 8 wherein said controller stores a virtual display, encoded in a lossy or lossless compressed format, in said physical display memory and manages said virtual display in said physical memory.

15. The controller of claim 8 wherein multiple virtual displays are encoded and stored in corresponding areas of physical display memory, said controller performs drawing operations on said physical display memory, and frame or subframe data that is encoded in either a lossless or lossy compressed format is transferred via a network to a remote terminal which needs to decode said encoded virtual display prior to display.

16. A method for operating a multi-user host system having multiple virtual machines, networked multiple remote terminals and multiple input controls, comprising the steps of:
using a host computer that
includes software, a main CPU and a hardware graphics and display controller,
runs more than one CPU virtual machine each of which corresponds to a virtual desktop for a different user,
includes a virtual graphics machine having virtual GPU status registers, virtual controls and virtual display memory, and
asynchronously generates virtual GPU operations for execution by the physical GPU hardware as if the virtual machine had an exclusive machine view of the hardware GPU;
runs a Virtual Machine Monitor which tracks context and state information for each of said virtual graphics machines and their asynchronous operations and achieves proper ordering and interleaving of said virtual GPU operations to the physical GPU hardware; and
controls access by said remote terminals to said CPU virtual machines;
processing said virtual machines independently so that each has access to I/O devices including the graphics and display controller and associated memory subsystems;
processing graphics and display controller commands asynchronously and directly from said virtual machines and translating said commands into context specific commands, without performing a context switch of the graphics and display controller, for said graphics and display controller including managing display frames and subframes for each virtual machine;
determining which of said networked multiple remote terminals is the destination for different ones of said display frames and subframes; and
propagating said display frames and subframes utilizing said main CPU according to network protocol techniques through a network interface to one or more of said networked multiple remote terminals.

17. The method of claim 16 further comprising the step of tracking said frames and subframes such that only changed frames and subframes are propagated through said network interface.

18. The method of claim 16 further comprising the step of encoding said frames and subframes with lossless or lossy compression prior to propagating them through said network interface.

19. The method of claim 16 wherein a virtual machine monitor operates as a hypervisor level on said main CPU to support said multiple virtual machines and manages address translation from each virtual machine into context specific addresses for the physical graphics and display controller.

20. The method of claim 19 wherein said virtual machine monitor sets up virtual I/O devices including the graphics and display controller such that each virtual machine runs an unmodified version of driver software as if it were running on a non-virtualized graphics and display controller, and wherein each virtual machine asynchronously accesses the graphics and display controller.

\* \* \* \* \*